(12) United States Patent
Cheng et al.

(10) Patent No.: US 6,634,452 B2
(45) Date of Patent: Oct. 21, 2003

(54) ELECTRIC SCOOTER POWER SWITCHING DEVICE

(75) Inventors: Tung-Chao Cheng, Yun Lin (TW); Yung Tay Yu, Chen Kuan (CN)

(73) Assignee: Chaw Khong Technology Co., Ltd., Taipei (TW)

( * ) Notice: Subject to any disclaimer, the term of this patent is extended or adjusted under 35 U.S.C. 154(b) by 0 days.

(21) Appl. No.: 10/028,483

(22) Filed: Dec. 28, 2001

(65) Prior Publication Data

US 2002/0092688 A1 Jul. 18, 2002

(30) Foreign Application Priority Data

Jan. 12, 2001 (TW) .................................. 90200712 U

(51) Int. Cl.[7] .............................................. B62K 11/10
(52) U.S. Cl. ..................... 180/220; 180/205; 180/368
(58) Field of Search ................................ 180/220, 219, 180/205, 368, 65.1

(56) References Cited

U.S. PATENT DOCUMENTS

| 3,905,442 | A | * | 9/1975 | O'Neill, Jr. ............ 180/220 |
| 3,978,936 | A | * | 9/1976 | Schwartz ............... 180/222 |
| 6,273,205 | B1 | * | 8/2001 | Tsai ..................... 180/181 |
| 6,343,667 | B2 | * | 2/2002 | Sauve ................... 180/228 |
| 6,394,213 | B1 | * | 5/2002 | Tsai ..................... 180/181 |
| 2002/0092692 | A1 | * | 7/2002 | Chen .................... 180/220 |

* cited by examiner

*Primary Examiner*—Kevin Hurley
(74) *Attorney, Agent, or Firm*—Troxell Law Office PLLC

(57) ABSTRACT

A power switching device mounted on an electric scooter is provided. The device comprises a coupling mechanism including a seat and an n-shaped connection member, a switching mechanism including a bent lever, an elastic mechanism, and a drive mechanism. The lever is operable to quickly switch the switching mechanism in one of an engaged locked state when the scooter is manually operated, a disengaged limited state, and a disengaged locked state both when the scooter is battery-operated.

4 Claims, 5 Drawing Sheets

ELECTRIC SCOOTER POWER SWITCHING DEVICE

BACKGROUND OF THE INVENTION

1. Field of the Invention

The present invention relates to an electric scooter and more particularly to a power switching device for quickly switching an electric scooter to battery-operated or manually operated mode.

2. Description of Related Art

One conventional scooter is pushed forward by foot. It is advantageous for being foldable and portable, while it is disadvantageous when wheeling an ascending road. Another conventional scooter is battery-operated (i.e., electric scooter) without the drawbacks of manually operated scooter. However, the construction of scooter has to be greatly modified in accommodation with the added battery and associated electrical devices. But the current scooter is still unsatisfactory even modified, as it can not be readily switched an electric scooter to manually operated mode when battery installed in the current scooter has been worn out, or it can not be changed from manually operated mode to a battery operated conveniently. Thus improvement exists.

SUMMARY OF THE INVENTION

It is an object of the present invention to provide an electric scooter power switching device capable of being quickly switched to one of an engaged locked state when the electric scooter is manually operated, a disengaged limited state, and a disengaged locked state both when the electric scooter is battery-operated.

To achieve the above and other objects, the present invention provides a power switching device mounted on an electric scooter including a coupling mechanism includes a seat, an n-shaped connection member, a first and second holes on both sides of said connection member, a third hole on a left side, a fourth hole above said third hole, a fifth hole on a right side, a sixth hole above fourth hole, a first threaded hole for motor, a second threaded hole for shaft, an internal spring receptacle, and a projected motor protector; a switching mechanism includes a bent lever having a pin hole, two opposite tabs, and a projection, a first spring, a cam having a first arcuate section, a second arcuate section, and a bore, a sleeve having a bore wherein said projection of said lever is inserted through said first spring, said hole of said cam, said second hole, and said bore of said sleeve to secure to said connection member, said first end of said first spring is secured in said pin hole, said tabs are urged against said connection member, and said second end of said first spring is secured to said top of said connection member; an elastic mechanism includes a bar-shaped first fastener having a threaded and a second spring wherein said threaded end of said first fastener is inserted through said seventh hole, said third hole, said second spring, and said fifth hole to secure in said third threaded hole, thus pivotably fastening said seat, and said first end of said second spring is secured to said eighth hole, and said second end of said second spring is secured to said spring receptacle, thus storing an elastic force in said seat; and a drive mechanism includes a sleeving member shaped to said rear wheel of said electric scooter for transmitting driving force thereto.

The above and other objects, features and advantages of the present invention will become apparent from the following detailed description taken with the accompanying drawings.

DETAILED DESCRIPTION OF THE PREFERRED EMBODIMENTS

Figure 1:
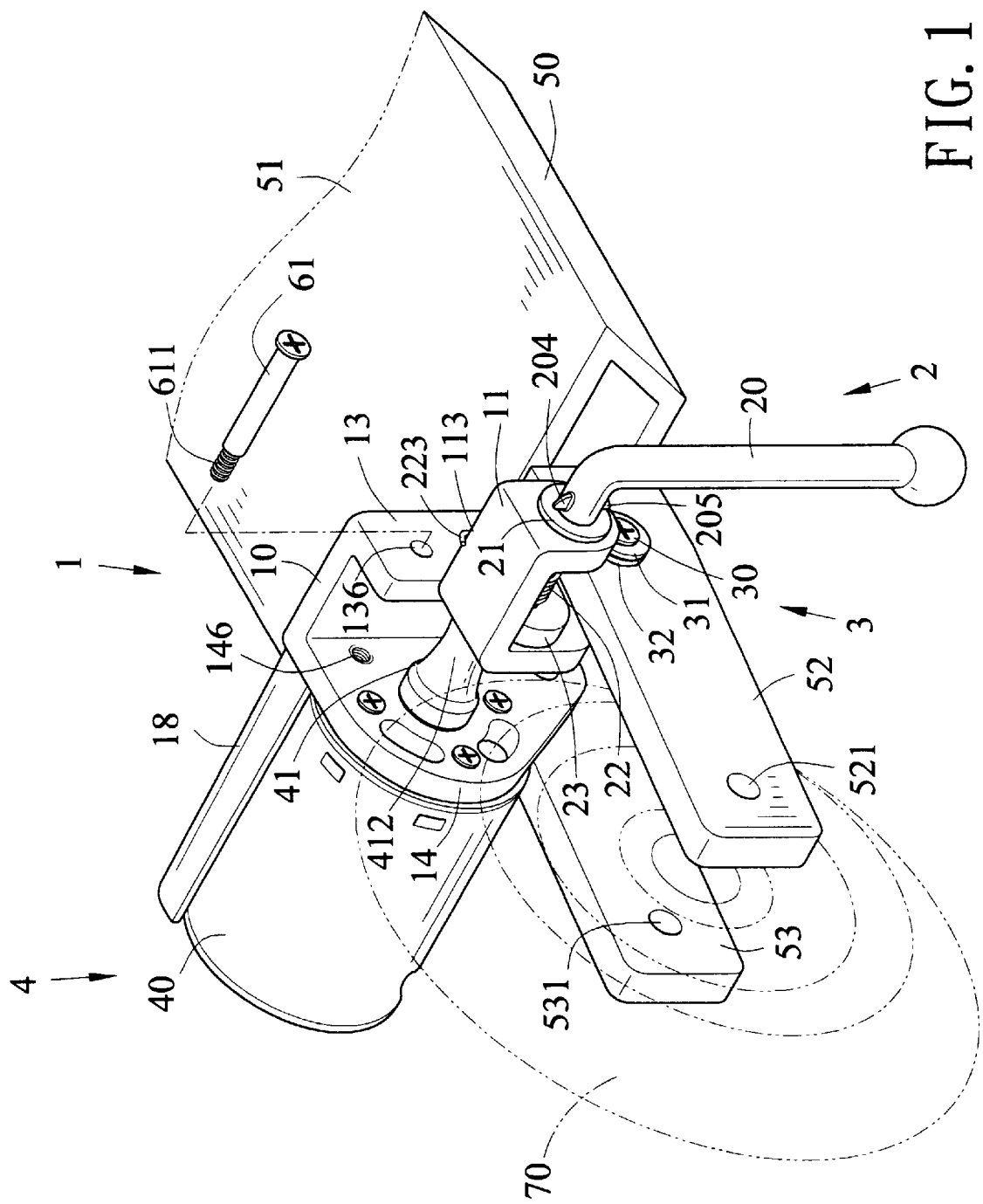
FIG. 1 is a perspective view of a power switching device mounted on an electric scooter according to the invention.
Figure 2:
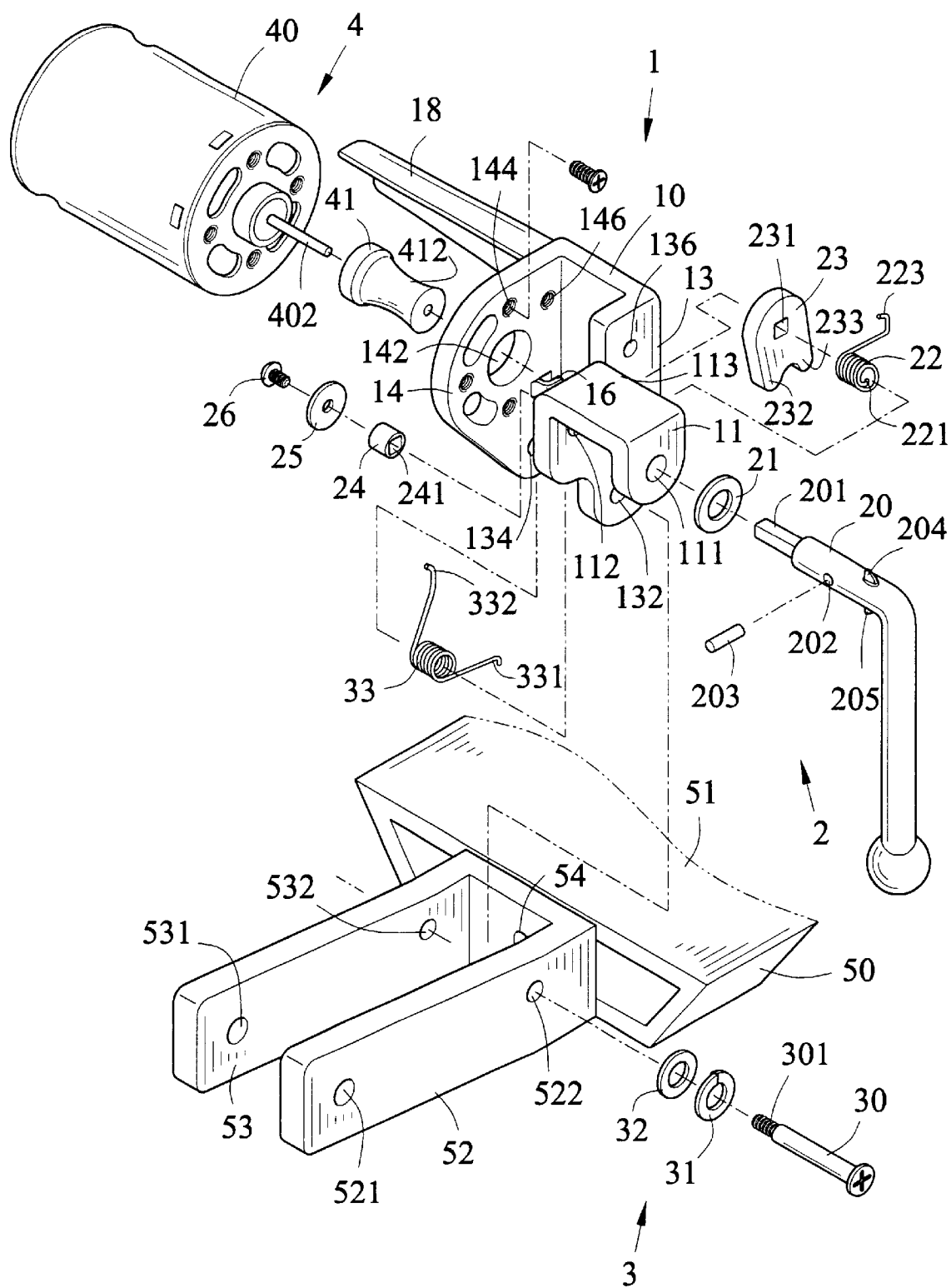
FIG. 2 is an exploded view of FIG. 1.
Figure 3:
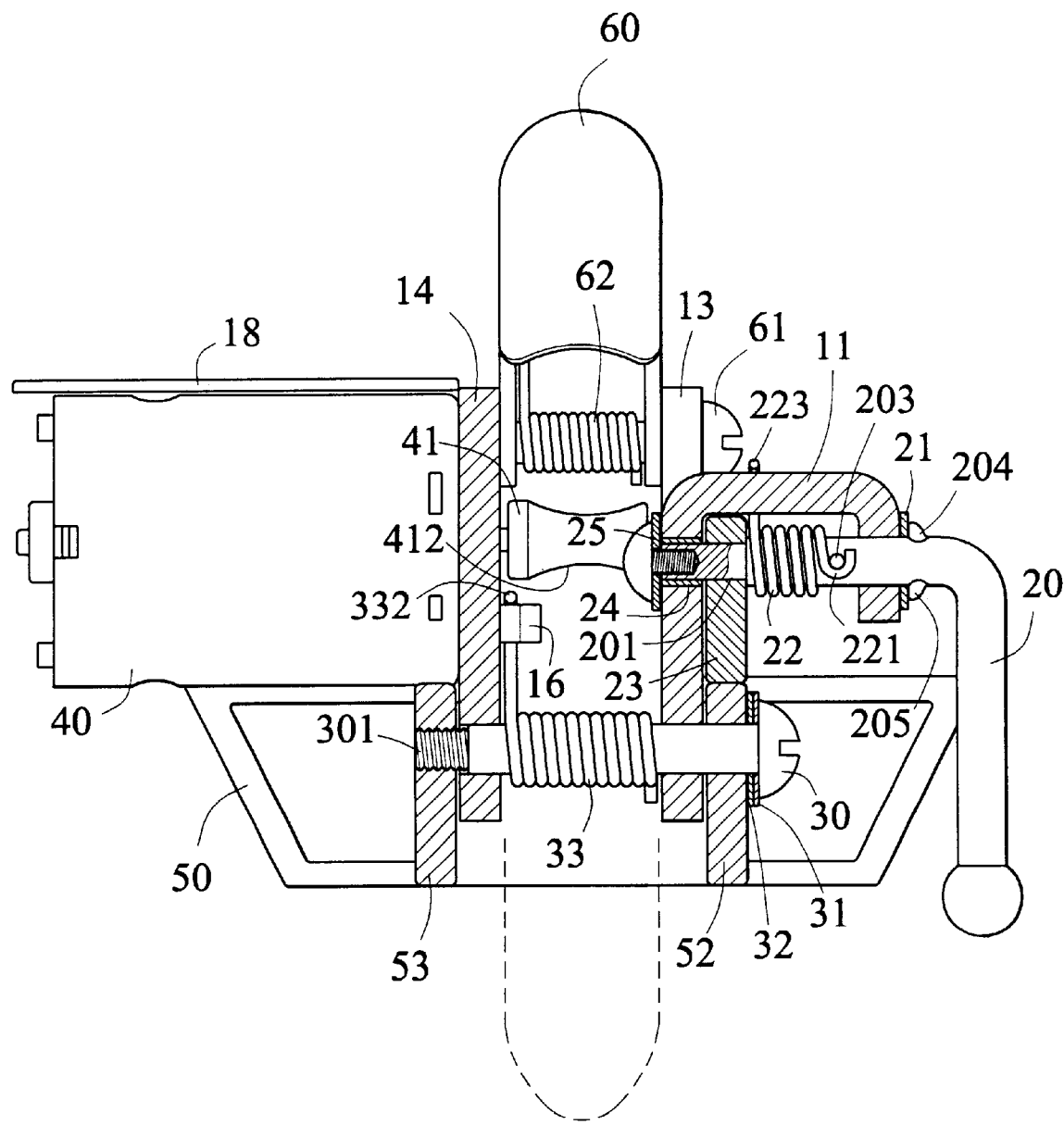
FIG. 3 is a sectional view of FIG. 1.
Figure 4:
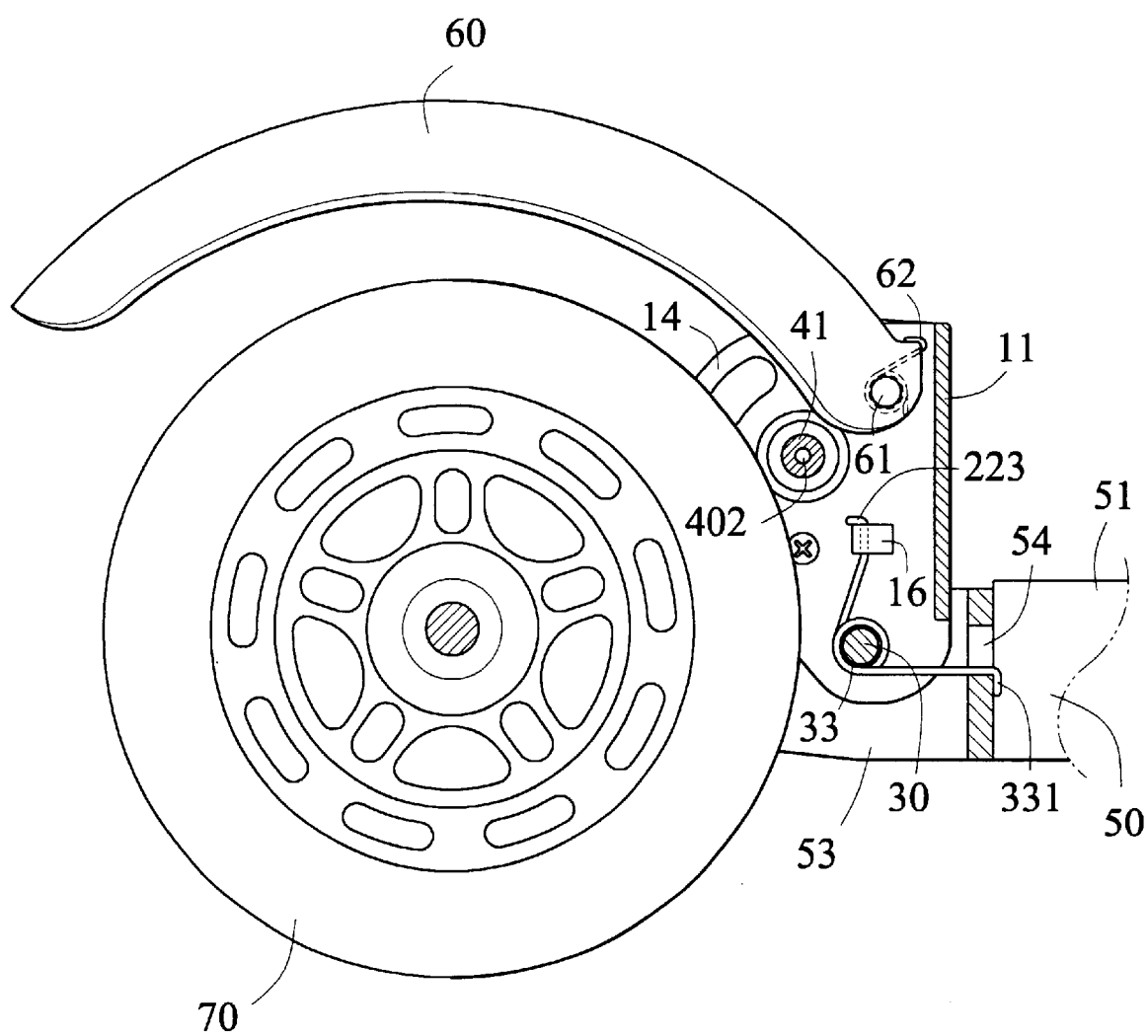
FIG. 4 is another sectional view of FIG. 1.

Referring to FIGS. 1 to 4, there is shown an electric scooter power switching device mounted on an electric scooter 50 in accordance with the invention. Electric scooter 50 comprises a footboard 51, an n-shaped bracket 51A connected to one end of the footboard 51 including a right member 52 having a seventh hole 522 and a first wheel hole 521, a left member 53 having a third threaded hole 532 and a second wheel hole 531, and a connection 54 coupled between the right and the left members 52 and 53 having an eighth hole 54A. The power switching device comprises a coupling mechanism 1 including a U-shaped seat 10, an n-shaped connection member 11, a first hole 111 on one side of the connection member 11, a second hole 112 on the other side of the connection member 11, a third hole 132 on left side 13, a fourth hole 136 above third hole 132, a fifth hole 134 on right side 14, a sixth hole 142 above fourth hole 134, a first threaded hole 144, a second threaded hole 146, a spring receptacle 16, and a projected motor protector 18; a switching mechanism 2 including a bent lever 20, a first washer 21, a first spring 22, a cam 23 having a square hole 231, a first arcuate section 232, and a second arcuate section 233, a sleeve 24 having a square bore 241, a second washer 25, and a screw 26 wherein the lever 20 comprises a projection 201 having a square cross-section inserted through first spring 22, the square hole 231 of cam 23, the second hole 112, and the square bore 241 of sleeve 24 to secure to the connection member 11 by second washer 25 and screw 26, a pin hole 202, a pin 203 inserted the pin hole 202 for securing to the first end 221 of first spring 22, and two opposite tabs 204 engaged with first washer 21; and the second end 223 of first spring 22 is secured to the top 113 of the connection member 11 such that a compression force is stored in first spring 22 by the above coupling first end 221 and second end 223 of first spring 22 to respective members when first spring 22 is deformed; an elastic mechanism 3 including a bar-shaped first fastener 30 having a threaded end 301, a clip ring 31, a third washer 32, and a second spring 33 wherein the threaded end 301 of first fastener 30 is inserted through clip ring 31, third washer 32, the seventh hole 522, the third hole 132, the second spring 33, and the fifth hole 134 to secure in the third threaded hole 532, thus pivotably fastening the seat 10; and the first end 331 of second spring 33 is secured to eighth hole 54A and the second end 332 thereof is secured to the spring receptacle 16 (see FIG. 3), thus storing an elastic force in the seat 10; and a drive mechanism 4 including a motor 40 having a shaft 402, a sleeving member 41 having a driving wheel 41 driven by a shaft 402 of motor 40, having a concave section 412 shaped to rear wheel 70 of electric scooter 50 for effectively. Electric scooter 50 further comprises a rear wheel fender 60 including a barshaped second fastener 61 (see FIGS. 1 and 3) having a threaded end 611 secured to second threaded hole 146 and a third spring 62 put on the shank portion of the second fastener 61.

Figure 5:
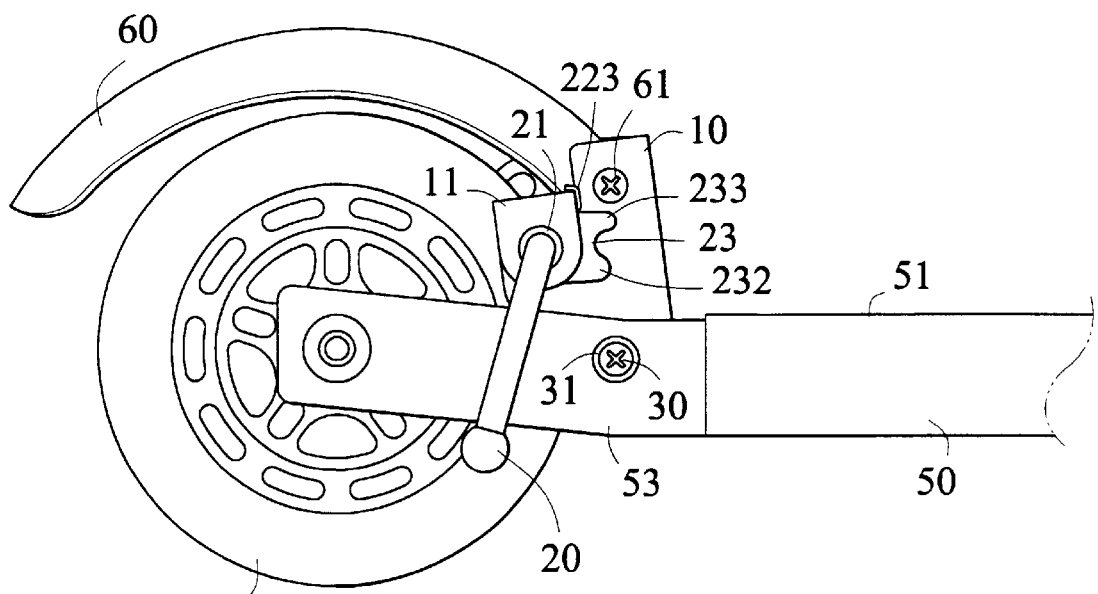
FIG. 5 is a partial side view of FIG. 1 electric scooter where power switching device is in an engaged locked state.

Referring to FIG. 5, there is shown the switching mechanism 2 in an engaged locked state. As shown, the head of lever 20 of switching mechanism 2 is at the lowest position. The first arcuate section 232 and second arcuate section 233 are disengaged from the right member 52. Hence, the seat 10 is slanted toward rear wheel 70 by the expansion of elastic force, thus ensuring a secure engagement.

Figure 6:
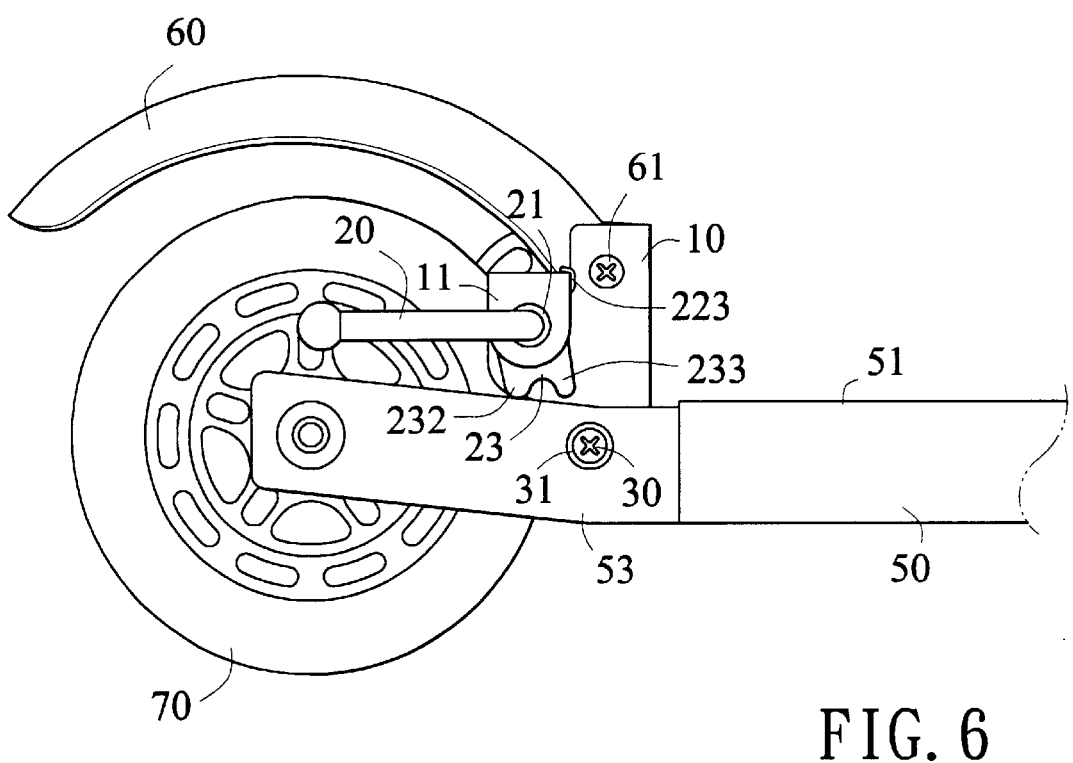
FIG. 6 is a view similar to FIG. 5 where power switching device is in a disengaged limited state.

Referring to FIG. 6, the head of lever 20 of switching mechanism 2 is pivoted to a higher position. The first arcuate section 232 is first engaged with the right member 52. Then the seat 10 is quickly disengaged from the rear wheel 70 by the pivoting first arcuate section 232. This is a disengaged limited state of switching mechanism 2. Next continuously pivot the head of lever 20 of switching mechanism 2 upward to its highest position. Thus the first arcuate section 232 and second arcuate section 233 are engaged with the right member 52 to form two supporting points, thus locking the cam 23. This is a disengaged locked state of switching mechanism 2. Note that switching mechanism 2 is in the engaged locked state when electric scooter 50 is manually operated. Further, switching mechanism 2 is in the disengaged limited or disengaged locked state when electric scooter 50 is battery-operated. Most importantly, the switching among these states is quick, efficient, and secure.

While the invention herein disclosed has been described by means of specific embodiments, numerous modifications and variations could be made thereto by those skilled in the art without departing from the scope and spirit of the invention set forth in the claims.

What is claimed is:

1. A power switching device for an electric scooter including a drive mechanism mounted on a coupling mechanism capable of forming a closely engaged transmission with a rear wheel of said electric scooter by a stored elastic force, and a switching mechanism for enabling said drive mechanism to quickly perform a disengagement or an engagement, said device comprising a coupling mechanism, a switching mechanism, an elastic mechanism, and a drive mechanism, wherein said drive mechanism mounted on said coupling mechanism is capable of forming a closely engaged transmission with a rear wheel of said electric scooter by said stored elastic force provided by said elastic mechanism so as to obtain a secure engagement, and said drive mechanism is capable of quickly switching to a state selected from the group consisting of an engaged locked state, a disengaged limited state, and a disengaged locked state by said switching mechanism, wherein said coupling mechanism comprises an n-shaped connection member as a seat for fixing to said switching mechanism.

2. A power switching device for an electric scooter including a drive mechanism mounted on a coupling mechanism capable of forming a closely engaged transmission with a rear wheel of said electric scooter by a stored elastic force, and a switching mechanism for enabling said drive mechanism to quickly perform a disengagement or an engagement, said device comprising a coupling mechanism, a switching mechanism, an elastic mechanism, and a drive mechanism, wherein said drive mechanism mounted on said coupling mechanism is capable of forming a closely engaged transmission with a rear wheel of said electric scooter by said stored elastic force provided by said elastic mechanism so as to obtain a secure engagement, and said drive mechanism is capable of quickly switching to a state selected from the group consisting of an engaged locked state, a disengaged limited state, and a disengaged locked state by said switching mechanism, wherein said switching mechanism comprises a cam having a first arcuate section and a second arcuate section so as to quickly switch to a state selected from the group consisting of said engaged locked state, said disengaged limited state, and said disengaged locked state.

3. A power switching device for an electric scooter including a drive mechanism mounted on a coupling mechanism capable of forming a closely engaged transmission with a rear wheel of said electric scooter by a stored elastic force, and a switching mechanism for enabling said drive mechanism to quickly perform a disengagement or an engagement, said device comprising a coupling mechanism, a switching mechanism, an elastic mechanism, and a drive mechanism, wherein said drive mechanism mounted on said coupling mechanism is capable of forming a closely engaged transmission with a rear wheel of said electric scooter by said stored elastic force provided by said elastic mechanism so as to obtain a secure engagement, and said drive mechanism is capable of quickly switching to a state selected from the group consisting of an engaged locked state, a disengaged limited state, and a disengaged locked state by said switching mechanism, wherein said elastic mechanism comprises a torsion spring having a first end secured to a hole of said electric scooter and a second end secured to said coupling mechanism, thus storing said elastic force in said coupling mechanism.

4. A power switching device for an electric scooter comprising a coupling mechanism, a switching mechanism, an elastic mechanism, and a drive mechanism wherein:

a coupling mechanism includes a seat, an n-shaped connection member, a first and second holes on both sides of said connection member, a third hole on a left side, a fourth hole above said third hole, a fifth hole on a right side, a sixth hole above fourth hole, a first threaded hole for motor, a second threaded hole for shaft, an internal spring receptacle, and a projected motor protector;

a switching mechanism includes a bent lever having a pin hole, two opposite tabs, and a projection, a first spring, a cam having a first arcuate section, a second arcuate section, and a bore, a sleeve having a bore wherein said projection of said lever is inserted through said first spring, said hole of said cam, said second hole, and said bore of said sleeve to secure to said connection member, said first end of said first spring is secured in said pin hole, said tabs are urged against said connection member, and said second end of said first spring is secured to said top of said connection member;

an elastic mechanism includes a bar-shaped first fastener having a threaded and a second spring wherein said threaded end of said first fastener is inserted through said seventh hole, said third hole, said second spring, and said fifth hole to secure in said third threaded hole, thus pivotably fastening said seat, and said first end of said second spring is secured to said eighth hole, and said second end of said second spring is secured to said spring receptacle, thus storing an elastic force in said seat; and a drive mechanism includes a sleeving member shaped to said rear wheel of said electric scooter for transmitting driving force thereto.

* * * * *